United States Patent
Sant et al.

(10) Patent No.: US 12,047,138 B2
(45) Date of Patent: Jul. 23, 2024

(54) BEAMFORMING MULTIPATH WIRELESS CHANNELS USING NEURAL NETWORKS

(71) Applicant: QUALCOMM Incorporated, San Diego, CA (US)

(72) Inventors: Aditya Uday Sant, San Diego, CA (US); Afshin Abdi, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/938,313

(22) Filed: Oct. 5, 2022

(65) Prior Publication Data

US 2023/0108467 A1    Apr. 6, 2023

Related U.S. Application Data

(60) Provisional application No. 63/253,074, filed on Oct. 6, 2021.

(51) Int. Cl.
*H04B 7/06* (2006.01)
*H04B 17/373* (2015.01)
*H04B 17/391* (2015.01)

(52) U.S. Cl.
CPC ......... *H04B 7/0617* (2013.01); *H04B 17/373* (2015.01); *H04B 17/3913* (2015.01)

(58) Field of Classification Search
CPC ............... H04B 7/0617; H04B 17/373; H04B 17/3913; H04B 17/328
USPC ................................ 375/267, 299, 347–349
See application file for complete search history.

(56) References Cited

U.S. PATENT DOCUMENTS

| 6,124,824 A * | 9/2000 | Xu ........................ H04B 7/0626 |
| | | 342/368 |
| 9,577,343 B2 * | 2/2017 | Park ........................ H01Q 5/42 |
| 10,938,464 B1 * | 3/2021 | Jeong ..................... H04B 7/063 |
| 11,303,336 B1 * | 4/2022 | Marupaduga ........ H04B 7/0617 |

(Continued)

OTHER PUBLICATIONS

International Search Report and Written Opinion—PCT/US2022/077680—ISA/EPO—Feb. 13, 2023.

(Continued)

*Primary Examiner* — Emmanuel Bayard
(74) *Attorney, Agent, or Firm* — Patterson & Sheridan, L.L.P/Qualcomm Incorporated

(57) ABSTRACT

Certain aspects of the present disclosure provide techniques and apparatus for identifying beamforming parameters to use in processing received signaling using a neural network. An example method generally includes receiving a first plurality of signals on a wireless communication channel. A first plurality of beamformed signals is generated by generating, for each respective signal of the first plurality of signals, a respective beamformed signal using beamforming parameters selected from a configured set of beamforming parameters. First predicted beamforming parameters are generated using a neural network and the first plurality of beamformed signals. A second signal is received on the wireless communication channel. The second signal is beamformed using beamforming parameters selected from a group of beamforming parameters including the configured set of beamforming parameters and the first predicted beamforming parameters.

22 Claims, 8 Drawing Sheets

(56) References Cited

U.S. PATENT DOCUMENTS

| | | | | |
|---|---|---|---|---|
| 2009/0233556 | A1* | 9/2009 | Xia | H04B 7/0617 455/63.4 |
| 2009/0323847 | A1* | 12/2009 | Na | H04B 7/0697 375/267 |
| 2010/0026560 | A1* | 2/2010 | Xia | G01S 3/74 342/173 |
| 2010/0103045 | A1* | 4/2010 | Liu | H04B 7/0632 342/372 |
| 2013/0329718 | A1* | 12/2013 | Liu | H04B 7/0695 370/338 |
| 2019/0033439 | A1* | 1/2019 | Gu | G01S 7/415 |
| 2019/0068264 | A1* | 2/2019 | Agrawal | H04W 72/046 |
| 2019/0228268 | A1 | 7/2019 | Zhang et al. | |
| 2019/0393948 | A1* | 12/2019 | Zhao | H04B 7/0408 |
| 2020/0007222 | A1* | 1/2020 | Ruder | H04B 7/0837 |
| 2020/0167586 | A1 | 5/2020 | Gao et al. | |
| 2020/0169311 | A1* | 5/2020 | Ottersten | H04B 7/0695 |
| 2020/0225317 | A1* | 7/2020 | Chen | G01S 7/417 |
| 2021/0013619 | A1* | 1/2021 | Alkhateeb | H01Q 15/148 |
| 2021/0318423 | A1* | 10/2021 | Wang | G01S 11/02 |
| 2021/0342687 | A1* | 11/2021 | Wang | G06N 3/045 |
| 2022/0077879 | A1* | 3/2022 | Husain | G06N 5/022 |
| 2022/0255223 | A1* | 8/2022 | Tran | H04L 67/535 |
| 2023/0039386 | A1* | 2/2023 | Kalkunte | H04W 52/143 |

OTHER PUBLICATIONS

Peken T., et al., "Deep Learning for SVD and Hybrid Beamforming", IEEE Transactions on Wireless Communications, IEEE Service Center, Piscataway, NJ, US, vol. 19, No. 10, Jun. 30, 2020, pp. 6621-6642, XP011814043, ISSN:1536-1276, DOI:10.1109/TWC.2020.3004386, Figure 3a Section III-B.

Partial International Search Report—PCT/US2022/077680—ISA/EPO—Dec. 19, 2022.

Ronquillo N., et al., "Sequential Learning of CSI for MmWave Initial Alignment", 2019 53rd Asilomar Conference on Signals, Systems, and Computers, IEEE, Nov. 3, 2019, pp. 1-6, XP033750895, DOI: 10.1109/IEEECONF44664.2019.9049035 [retrieved on Mar. 26, 2020], Section II, Section III, Algorithm 1.

Sant A., et al., "Deep Sequential Beamformer Learning for Multipath Channels in Mmwave Communication Systems", ICASSP 2022—2022, IEEE International Conference on Acoustics, Speech and Signal Processing (ICASSP), IEEE, May 23, 2022, pp. 5198-5202, XP034156626, DOI: 10.1109/ICASSP43922.2022.9746028 [retrieved on Apr. 27, 2022], Sections 1-4.

Sohrabi F., et al., "Deep Active Learning Approach to Adaptive Beamforming for mmWave Initial Alignment", IEEE Journal on Selected Areas in Communications, IEEE Service Center, Piscataway, US, vol. 39, No. 8, Jun. 7, 2021, pp. 1-15, XP011866419, ISSN: 0733-8716, DOI: 10.1109/JSAC.2021.3087234 [retrieved on Jul. 14, 2021], Section II.

\* cited by examiner

Algorithm 1 Pretraining for Deep Unfolded Beamformer Learning

Training data: $\{y_s^{(m)}\}_{m=1}^{N_{train}}, \{y_{1:9}^{(m)}\}_{m=1}^{N_{train}}$ Input: $W_{pilot} = [w_1, w_2, w_3, w_4], \{FCN_i\}_{i=1}^6$ Output: Net$_{active}$ 1: Net$_{active}$ = FCN$_1$       # *static pretraining*
2: Train Net$_{active}$ using $\mathcal{L} = \frac{1}{N_{train}} \sum_{m=1}^{N_{train}} |(w_5^{(m)})^H y_s^{(m)}|^2$
3: $\hat{W}_{pilot}^{(m)} = W_{pilot}, \forall m = 1, 2, \ldots, N_{train}$
4: for $k = 5$ to 9 do       # *active pretraining*
5:    $\hat{W}_{pilot}^{(m)} \leftarrow [\hat{W}_{pilot}^{(m)}, w_k^{(m)}], \forall m = 1, 2, \ldots, N_{train}$
6:    $x_{1:k}^{(m)} \leftarrow \{x_{1:k-1}^{(m)}, (w_k^{(m)})^H y_k^{(m)}\}, \forall m = 1, 2, \ldots, N_{train}$
7:    Net$_{active} \leftarrow$ concat(Net$_{active}$, FCN$_{k-3}$)
8:    Train Net$_{active}$ using
     $\mathcal{L} = \frac{1}{N_{train}} \sum_{m=1}^{N_{train}} |(w_{k+1}^{(m)})^H y_s^{(m)}|^2$
9: end for

*FIG. 4*

BEAMFORMING MULTIPATH WIRELESS CHANNELS USING NEURAL NETWORKS

CROSS-REFERENCE TO RELATED APPLICATIONS

This application claims benefit of and priority to U.S. Provisional Patent Application Ser. No. 63/253,074, entitled "Generating Beamformers for Multipath Wireless Channels Using Neural Networks," filed Oct. 6, 2021, and assigned to the assignee hereof, the entire contents of which are hereby incorporated by reference.

INTRODUCTION

Aspects of the present disclosure relate to using machine learning techniques to improve beamforming in wireless communication systems.

Beamforming, or spatial filtering, is a processing technique in wireless communications systems that allows for directionality in signal transmission and reception. Generally, when signals are beamformed, a signal may be transmitted with a highest radiated power in a particular direction from a transmitting device. This differs from systems in which beamforming is not used, as transmission of signals without the use of beamforming techniques generally results in a signal transmitted omnidirectionally with a transmission power that is substantially similar along any direction from the transmitting device. By using beamforming techniques, multiple-input, multiple-output (MIMO) systems at receivers can exploit the directional characteristics of beamformed techniques to support robust communications at low signal-to-noise ratios.

In some wireless communications systems, such as 5G systems, millimeter wave transmission may be supported. Millimeter wave transmission may be highly directional due to various physical properties of millimeter wave transmissions. For example, in millimeter wave communications, a wireless signal may include multiple different angular (directional) components, all of which may be unknown to a receiver of signaling transmitted using millimeter wave transmission. Identifying beamforming parameters (such as a matrix w including a set of weights to apply to the angular components of a wireless signal) to process a received signal may be feasible when a receiving device has established a connection with a transmitting device, as the receiving device can use measurements of received signals to identify the beamforming parameters to use that will result in a highest received signal strength for the received signal. However, in some situations, such as initial access (e.g., the process by which a receiving device establishes a connection with a transmitting device), there may not be sufficient data from which the beamforming parameters, or at least a beamforming parameter that sufficiently improves the quality of the received signal, can be identified.

Accordingly, what is needed are improved techniques for identifying beamforming parameters in wireless communication systems.

BRIEF SUMMARY

Certain aspects provide a method for identifying beamforming parameters to use in processing received signaling using a neural network. An example method generally includes receiving a first plurality of signals on a wireless communication channel. A beamformed first plurality of signals is generated by generating, for each respective signal of the first plurality of signals, a respective beamformed signal using beamforming parameters selected from a configured set of beamforming parameters. First predicted beamforming parameters are generated using a neural network and the beamformed first plurality of signals. A second signal is received on the wireless communication channel. The second signal is beamformed using beamforming parameters selected from a group of beamforming parameters including the configured set of beamforming parameters and the first predicted beamforming parameters.

Certain aspects provide a method for training a neural network to identify beamforming parameters to use in processing received signaling. An example method generally includes receiving a training data set of a plurality of signals over an unknown channel. A first sub-network in a neural network is trained based on the training data set of the plurality of signals over the unknown channel and a configured set of beamforming parameters. A plurality of second sub-networks in the neural network are trained based on an output of a previous sub-network and the training data set of the plurality of signals over the unknown channel. The neural network is deployed.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain features of the one or more aspects and are therefore not to be considered limiting of the scope of this disclosure.

FIG. 4 depicts example pseudocode of an algorithm for training a neural network to predict beamforming parameters to use in processing received signaling, according to aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
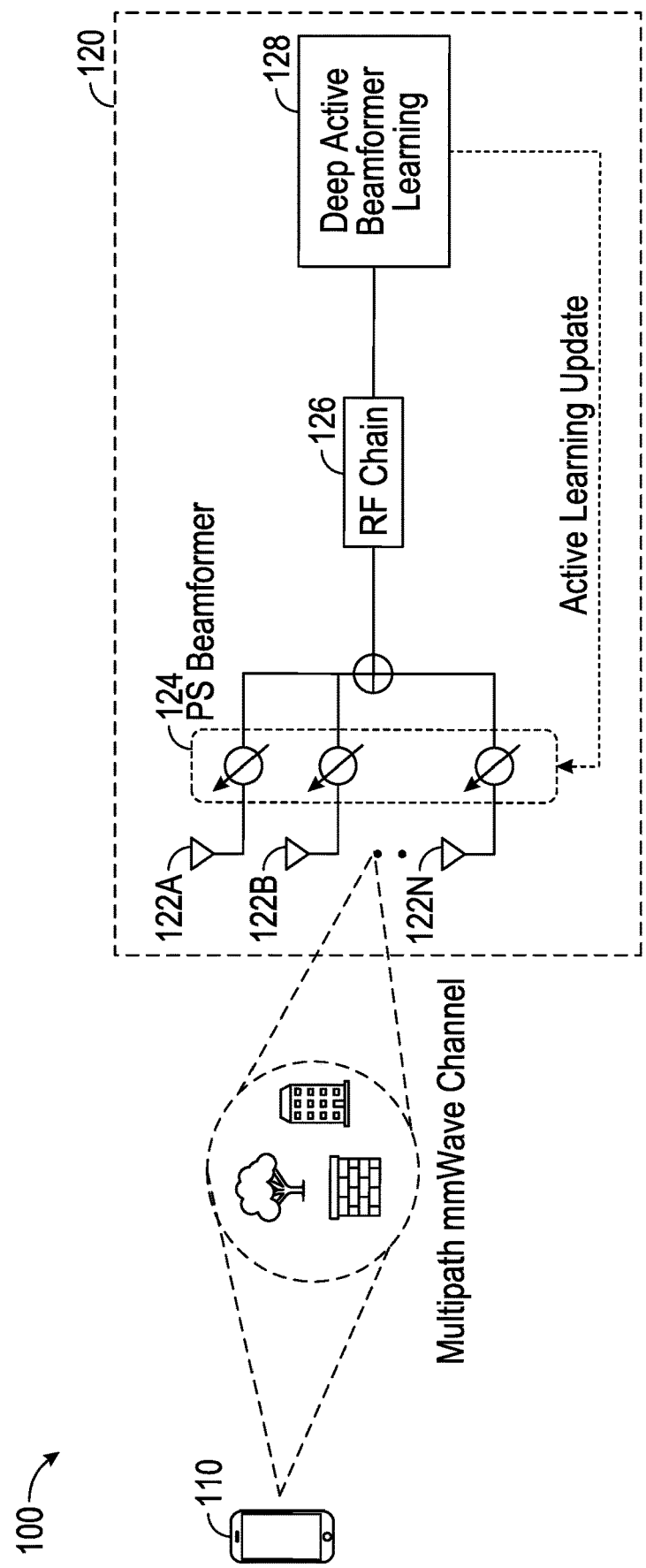
FIG. 1 depicts a wireless communication system in which received signaling includes a multipath component and is beamformed.

Aspects of the present disclosure provide techniques for predicting beamforming parameters to use in processing received signaling in a wireless communication system. Generally, these beamforming parameters may include various parameters that can be used to process a received signal such that the processed signal is recovered at a high signal strength. In practice, beamforming may be achieved by applying these parameters to a received signal through phase shifters that can change the angle at which the signal is received.

Beamforming generally allows for signaling to be transmitted in wireless communication systems directionally, which may allow for robust communications at improved signal-to-noise ratios. Generally, when a signal is beamformed, the signal may be received at a highest received power (e.g., a highest signal-to-noise ratio, signal-to-interference-plus-noise ratio, etc.) at a particular spatial direction relative to the transmitting device, and may be received at a low received power or below a detection threshold at directions other than that particular spatial direction.

While beamforming can allow for robust communications in wireless communications systems, properties of communications at different frequencies can affect the complexity of beamforming. For example, in millimeter wave communications systems (e.g., where signaling is transmitted at frequencies for which the corresponding wavelength can be measured in millimeters, such as bands in the Extremely High Frequency (EHF) range with frequencies between 30 GHz and 300 GHz), wireless communication channels may include multiple angular components. Thus, signaling transmitted in millimeter wave communications systems may be considered a specular multipath signal for which accurate estimation and tracking of angular components may be needed for various operations, such as initial access.

Active learning is one technique that can be used to identify beamforming parameters to use in beamforming received signaling in wireless communications systems. In some cases, active learning can use information such as an angular posterior distribution for traversing through codebooks, channel estimation, signal tracking, and the like. However, active learning algorithms may be best suited for line-of-sight channels, and extending these algorithms to accommodate spectral multipath components (e.g., as in signaling transmitted in millimeter wave communications systems where signaling includes a plurality of multipath components) may result in an intractable problem due to the unknown number of spectral multipath components in a signal. Further, using active learning techniques trained using line-of-sight channel information to identify beamforming parameters to use in beamforming received signals in systems with spectral multipath components may not recover a signal at a maximum received power. For example, because these active learning techniques may generate beamforming parameters that beamform for line-of-sight components, but do not account for non-line-of-sight spectral multipath components, channel diversity may not be fully exploited. Thus, some spectral multipath components may not be recovered, and the received signal may thus be received at a lower received power than a maximum received power that the signal could be received at if beamforming parameters accounted for both line-of-sight and non-line-of-sight multipath components.

Aspects of the present disclosure provide techniques that allow for the generation of predicted beamforming parameters to use in beamforming received signaling using neural networks. As discussed in further detail herein, initial measurements can be performed using an initial configured set of beamforming parameters, and subsequent predicted beamforming parameters can be generated using a neural network and measurements generated based on a received signal and the initial configured set of beamforming parameters until a sufficiently large set of beamforming parameters (including the initially configured set of beamforming parameters and the predicted beamforming parameters) is generated. Because these beamforming parameters may be generated using predictive techniques, aspects of the present disclosure may reduce the amount of time and compute resources involved to beamform received signals and perform various tasks in a wireless communication system (e.g., initial access). This may further reduce the amount of power used by wireless devices to perform these tasks, relative to the amount of power used by wireless devices when statically defined sets of beamforming parameters are used to beamform received signals, particularly in situations where a limited number of measurements may be performed in a given time period.

Example Multipath Wireless System

FIG. 1 illustrates an example wireless communications system 100 in which received signaling includes multipath components and in which the received signaling is beamformed to recover the contents of the received signaling. Generally, the multipath components may correspond to the same signal received at different times and/or using different antennas due to variances in how a signal propagates from transmitting device 110 and receiving device 120 in the wireless communications system 100. For example, the multipath components of a received signal may include a line-of-sight component corresponding to a component that is received directly from the transmitting device 110 and one or more non-line-of-sight components corresponding to components that are received at receiving device 120 after reflection, refraction, or other attenuation caused by environmental effects and/or other objects in the environment in which wireless communication system 100 operates. Generally, transmitting device 110 may transmit signaling on a multipath millimeter wave channel to receiving device 120. The millimeter wave channel may be one or more wireless communications channels operating, for example, in the EHF band (between 30 GHz and 300 GHz) or on other frequencies with short wavelengths and high frequencies. Transmitting device 110 may be, for example a user equipment (UE), and receiving device 120 may be a network entity such as a base station (e.g., gNodeB, eNodeB, etc.) in this example, though in other examples, different transmitting and receiving devices may be used.

In an initial access phase within wireless communication system 100, T pilot transmissions from the transmitting device 110 may be received at receiving device 120. The multipath received signal at the receiving device 120 may be represented by the following equation:

$$y(t) = \sum_{i=1}^{L} \sqrt{P_i}\, \alpha_i a(\theta_i) + n(t),\ t = 0, 1, , T-1, \quad (1)$$

where y(t) represents the signal received at the antennas 122 at time t, $P_i$ represents the received power of the signal, $\alpha_i$ is a random path gain coefficient, $\theta_i$ is the angle of the $i^{th}$ multipath, and L is the number of multipaths in the received signal y(t). For a receiver with N antennas, the receiver manifold, corresponding to a model describing the properties of the N antennas, may be represented by the following equation:

$$a(\theta_i) = [1, e^{j2\pi d\,\sin\theta_i/\lambda}, e^{j2(n-1)\pi d\,\sin\theta_i/\lambda}]^T \quad (2)$$

where $\alpha(\theta_i)$ represents the random path gain coefficient for a received signal at the angle $\theta_i$ of the $i^{th}$ multipath. Finally, a noise model, such as an additive white Gaussian noise (AWGN) model, may be used. The noise model may be represented by the following expression:

$$n(t) \in \mathcal{CN}(0, \lambda I) \quad (3)$$

where n represents the noise model at time t and is represented as a complex normal distribution between the values 0 and $\lambda I$ (a maximum value I, multiplied by the wavelength $\lambda$).

As illustrated, receiving device 120 can perform analog beamforming for the received signal represented by Equation 1 through one or more phase shifting (PS) beamformers 124 associated with the one or more antennas 122. While FIG. 1 illustrates a beamformer as a phase shifting beamformer, it should be recognized that other types of beamformers that beamform received signals using other techniques may also or alternatively be used in place of PS beamformers 124. At time t, the response from PS beamformers 124 may be represented as w(t), and the observed signal may be represented by the following equation:

$$x(t) = w(t)^H y(t) = \sum_{i=1}^{L} \sqrt{P_i}\, \alpha_i w(t)^H a(\theta_i) + w(t)^H n(t) \quad (4)$$

The observed signal may then be processed by RF chain 126, and the output of the RF chain 126 may be used by a deep active beamformer learning block 128 to update the PS beamformers 124. Generally, in updating the PS beamformers 124, deep active beamformer learning block 128 can generate and deploy new sets of beamforming parameters, such as beamforming coefficient matrices or other parameters defining how an incoming signal is to be beamformed, for the PS beamformers 124 to use in processing subsequently received signals.

To exploit multipath diversity and maximize the signal strength of the observed signal, optimal beamforming parameters w may be designed to maximize the input signal strength. The signal strength may be a signal-to-noise ratio (SNR), defined according to the following equation:

$$SNR = \frac{\left|\sum_{i=1}^{L} \sqrt{P_i}\, \alpha_i w^H a(\theta_i)\right|^2}{\mathbb{E}_n |w^H n|^2} \quad (5)$$

where $P_i$ represents the power of the $i^{th}$ received signal, $\alpha_i$ represents the random path gain coefficient, $\theta_i$ is the angle of the $i^{th}$ multipath, and $w^H$ is the beamforming matrix applied to a received signal.

In some cases, where the noise n is Gaussian white noise and where beamforming matrix w is applied to a received signal via phase shifters, an optimized beamforming matrix w that maximizes the input signal strength may be represented by the following equation:

$$\hat{w} = \arg\max_{w} \left|\sum_{i=1}^{L} \sqrt{P_i}\, \alpha_i w^H a(\theta_i)\right|^2 \quad (6)$$

$$\text{such that } |w[k]| = \frac{1}{\sqrt{N}},\ \forall\, k = 1, 2, , N.$$

In some cases, the optimal beamforming matrix w (or other optimal beamforming parameters) may be an SNR-maximizing filter that is the matched filter to a received signal. Thus, PS beamformer 124 may be configured to solve a problem of obtaining this matched filter beamforming matrix defined by Equation 6. Given a received signal $y_s$ represented by the equation $y_s = \sum_{i=1}^{L} \sqrt{P_i}\, \alpha_i a(\theta_i)$ and a received signal power $P_s$, solving for the optimal beamforming matrix may be performed by simplifying Equation 6 as follows:

$$P_s = |w^H y_s|^2 = \left|\sum_{k=1}^{N} w[k]^* y_s[k]\right|^2 \leq \left[\sum_{k=1}^{N} |w[k]^*| \cdot |y_s[k]|\right]^2 = \frac{1}{N}\left[\sum_{k=1}^{N} |y_s[k]|\right]^2 \quad (7)$$

where k represents one of a plurality of antennas 1 through N.

In Equation 7, the inequality function may be performed using a triangle inequality, in which the sum of two lengths of a triangle is greater than or equal to the length of the remaining side. Using the inequality function defined by Equation 7 and the constraints defined in Equation 6, the optimal beamforming matrix w may be represented by the following equation:

$$\hat{w}[k] = \frac{1}{\sqrt{N}} \frac{y_s[k]}{|y_s[k]|},\ \forall\, n = 1, 2, , N. \quad (8)$$

One technique for extracting the matched filter beamforming matrix w from beamformed observations of received signals may include a technique by which a deep neural network extracts the matched filter beamforming matrix w. In this technique, a set of received pilot signals $y_{1:T} = [y(0), y(1), \ldots, y(T-1)]$ may be beamformed using T randomly chosen static pilot beamforming parameters $W_{pilot} = [w(0), w(1), \ldots, w(T-1)]$. According to Equation 4, thus, the resulting measurements (e.g., beamformed signals) may be represented as $x = [x(0), x(1), \ldots, x(T-1)]^T$. The measurements x may be fed into a neural network, such as a fully connected neural network, to estimate the ideal beamforming matrix w.

In this example, a fully connected neural network or other neural network may be configured to solve the inverse function defined by Equation 8. The fully connected neural network may be trained to minimize a negative signal power (e.g., reference signal received power, RSRP) loss function defined by the following equation:

$$\mathcal{L} = -\frac{1}{N_{train}} \sum_{m=1}^{N_{train}} |(\hat{w}^{(m)})^H y_s^{(m)}|^2 \qquad (9)$$

where $N_{train}$ corresponds to a number of training samples, and $(\hat{w}^{(m)})^H y_s^{(m)}$ is the signal strength of the recovered signal y using beamforming matrix w.

In this example, a large number of pilot signals may be needed to optimize beamforming performance. Each pilot signal may be beamformed using beamforming parameters selected from a configured set of beamforming parameters (e.g., beamforming matrices) prior to being used by the neural network to predict an optimized beamforming matrix w (or other beamforming parameters that may be used to beamform a signal). In some situations, such as initial access, a significant amount of time may elapse in order to receive a sufficient number of pilot signals for use in obtaining optimized beamforming parameters, which may delay various operations within a wireless communication system (e.g., initial access).

Example Neural Networks for Predicting Beamforming Parameters for Multipath Wireless Channels To accelerate the process of identifying an optimal beamformer to use in processing signaling received in multipath channels, aspects of the present disclosure sequentially build beamforming parameters that can be used in beamforming received signals using neural networks.

Figure 2:
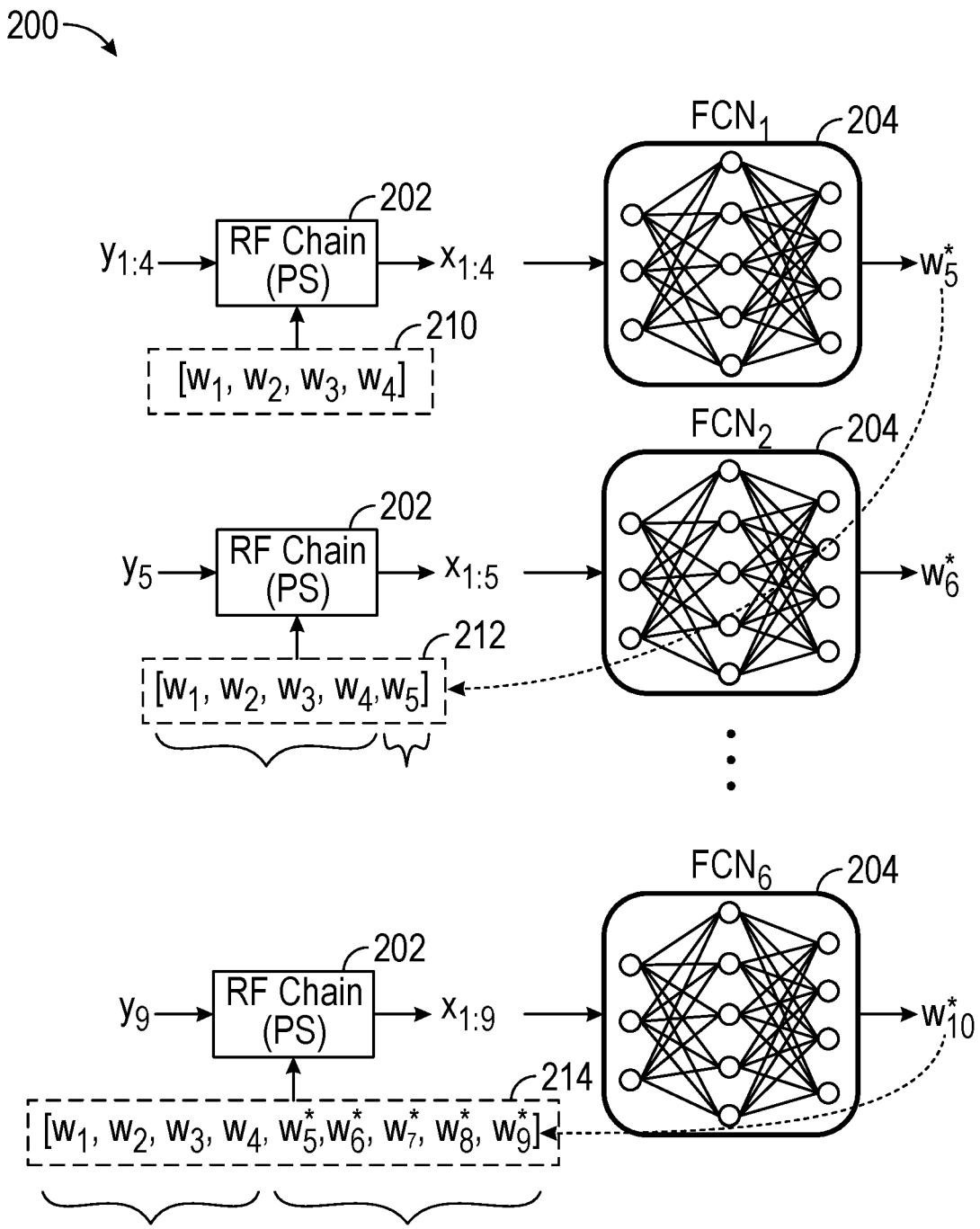
FIG. 2 depicts an example fully connected neural network for identifying beamforming parameters to use in processing received signaling, according to aspects of the present disclosure.

FIG. 2 depicts an example pipeline 200 for generating predicted beamforming parameters to use in processing received signaling using a fully connected neural network, according to aspects of the present disclosure. Pipeline 200 may enable deep unfolded beamforming parameter learning, in which the fully connected neural network includes a plurality of layers with each layer representing a different temporal layer and in which the fully connected neural network can jointly build a dynamic group of beamforming parameters and estimate beamforming parameters over each received symbol (e.g., each received pilot symbol) that can be used to beamform a signal. As illustrated, pipeline 200 may begin with an initial stage in which a configured set [$w_1$, $w_2$, $w_3$, $w_4$] of beamforming parameters 210 are retrieved (e.g., from a defined set of beamforming parameters). At a first stage in pipeline 200, an initial set of signals y=[$y_1$, $y_2$, $y_3$, $y_4$] are received on a wireless communication channel and processed through RF chain 202 using the configured set of beamforming parameters 210 to obtain a set of beamformed signals x. The set of beamformed signals x=[$x_1$, $x_2$, $x_3$, $x_4$] are then processed through fully connected network 204 to generate predicted beamforming parameters $w^*_5$, which may, in some aspects, be a predicted codebook or beamforming matrix that can be used to beamform a received signal. The beamforming parameters $w^*_5$ may be added to the configured set of beamforming parameters 210, thus creating a dynamic group of beamforming parameters 212 defined as [$w_1$, $w_2$, $w_3$, $w_4$, $w^*_5$].

At the next stage of pipeline 200, the predicted beamforming parameters may be used at RF chain 202 to process a newly received signal (e.g., a pilot signal) $y_s$. A set of beamformed signals x=[$x_1$, $x_2$, $x_3$, $x_4$, $x_5$] may be input into fully connected network 204 to generate predicted beamforming parameters $w^*_6$. Predicted beamforming parameters $w^*_6$ may be added to the dynamic group of beamforming parameters 212, and this process may be repeated until the dynamic group of beamforming parameters includes a threshold number of beamforming parameters, as illustrated in dynamic group of beamforming parameters 214. As illustrated, the dynamic group of beamforming parameters may include 10 beamforming parameters: the initially configured set of beamforming parameters [$w_1$, $w_2$, $w_3$, $w_4$] and the predicted set of beamforming parameters [$w^*_5$, $w^*_6$, $w^*_7$, $w^*_8$, $w^*_9$, $w^*_{10}$].

In one example, the fully connected network 204 may have 8+2(k−1) input neurons, where k represents a number of sub-networks included in the fully connected network. The fully connected network 204 may include a number of hidden layers and hidden neurons, with the hidden layers including a fully connected network, a rectified linear unit, and a batch normalizer. The output layer may normalize predicted beamforming parameters according to the equation $$|w[i]| = \frac{1}{\sqrt{N}},$$

where N corresponds to a number of antennas over which a signal is to be received.

Figure 3:
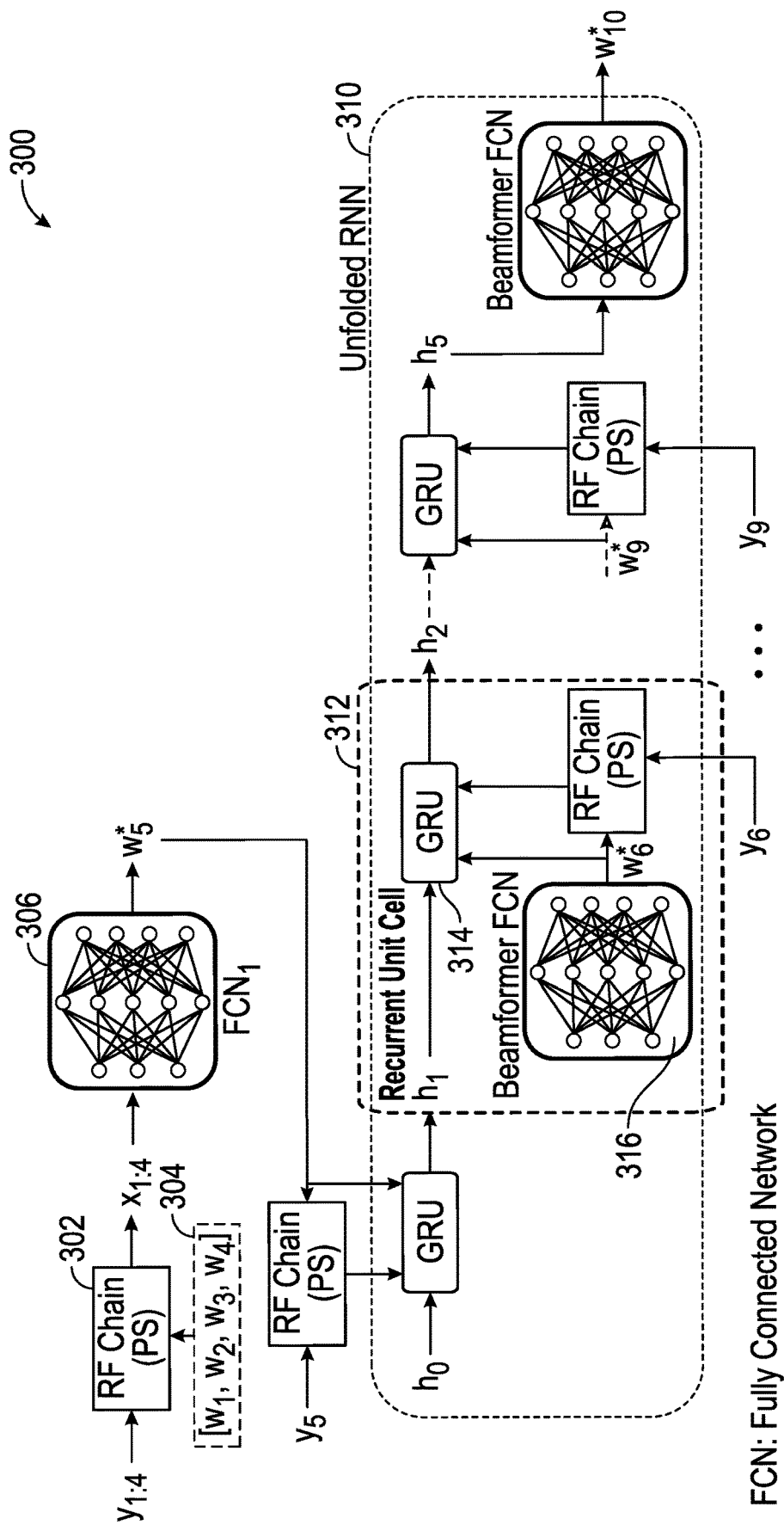
FIG. 3 depicts an example recurrent neural network for identifying beamforming parameters to use in processing received signaling, according to aspects of the present disclosure.

FIG. 3 illustrates an example pipeline 300 for identifying beamforming parameters to use in processing received signaling using a recurrent neural network, according to aspects of the present disclosure. Pipeline 300 may enable deep recurrent beamformer learning, in which the fully connected neural network can iteratively fine-tune beamforming parameters using each of a plurality of newly received symbols (e.g., a plurality of received pilot symbols).

In pipeline 300, a fully connected network 306, which may retain the structure of fully connected network 204 illustrated in FIG. 2 and discussed above, may generate initial predicted beamforming parameters $w^*_5$ based on the beamformed signals x=[$x_1$, $x_2$, $x_3$, $x_4$] generated by applying a configured set of beamforming parameters 304 to received signals y=[$y_1$, $y_2$, $y_3$, $y_4$] through RF chain 302. An unfolded recurrent neural network 310 may then be used to iteratively refine the initial predicted beamforming parameters $w^*_5$ until the dynamic group of beamforming parameters includes a threshold number of beamforming parameters (e.g., the set of 10 beamforming parameters including the initially configured set of beamforming parameters [$w_1$, $w_2$, $w_3$, $w_4$] and a predicted set of beamforming parameters [$w^*_5$, $w^*_6$, $w^*_7$, $w^*_8$, $w^*_9$, $w^*_{10}$], similar to the set of beamforming parameters discussed above with respect to FIG. 2).

As illustrated, recurrent neural network 310 may include a recurrent unit 312 that is used to iteratively refine predicted beamforming parameters until the predicted beamforming parameters $w^*_{10}$ are generated with properties that may result in an ideal matched filter response (e.g., highest signal strength) for the channel. In the example discussed above, where the group of beamforming parameters includes 10 groups of beamforming parameters, a recurrent neural network 310 can be used to iteratively refine initial predicted beamforming parameters $w^*_5$ by newly received pilots $\{y_i\}_{i=5}^{9}$. Further, as illustrated, a hidden state generated by a gated recurrent network (e.g., gated recurrent unit 314) from the previous stage of the recurrent neural network may be used as input into a fully connected neural network (e.g., fully connected network 316), which may allow for short-term and long-term memory to be used in identifying hidden states from the beamformed signals, the gated recurrent unit at a previous stage in recurrent neural network 310, and a received and beamformed signal received at a receiving device from a transmitting device. Recurrent unit 312 may include a gated recurrent unit 314 and a fully connected network 316. The input data (e.g., $w_5$ and $x_5$) may be input into a gated recurrent unit 314, which generates a hidden state $h_x$ of the gated recurrent unit that can be used in generating an output hidden state. A sequence of adaptively estimated beamforming parameters, concatenated with beamformed measurements, can be used as a time-series input into the gated recurrent unit 314 for each round of beamforming parameter prediction until optimized beamforming parameters $\hat{w}_{10}$ are generated.

In some aspects, the fully connected network 316 can use the hidden features identified by the gated recurrent unit 314 for the $k^{th}$ input to transform a hidden state of the recurrent unit $h_k$ into new beamforming parameters $w_k$. These new beamforming parameters $w_{k+5}$ may be added to the group of beamforming parameters 304 and with other previously predicted beamformer responses (if any) to create a larger set of beamforming parameters that the receiving device can use in beamforming and performing other processing of received signals. In some aspects, because there may be no supervised data for intermediate predicted beamforming parameters between the first predicted beamforming parameters and the penultimate predicted beamforming parameters, the last predicted beamforming parameters may be the optimal beamforming parameters having a best matched filter response (which, as discussed above, corresponds to a highest signal strength). The path by which these optimal beamforming parameters is generated may not be directly guided, as supervised data that could ordinarily be used in guiding operations performed by a neural network may not be available for the beamforming parameters $w_5$ through $w_9$. However, a weighted loss function, discussed in further detail below, can be used to guide the generation of the beamforming parameters $w_5$ through $w_9$ until the final, optimal beamforming parameter $w_{10}$ is generated.

In some aspects, to train a neural network for predicting beamforming parameters to use for beamforming signals, the neural network can be trained using unsupervised learning techniques. A training data set may include a plurality of signals y received over an unknown channel and a set of beamforming parameters $W_{pilot}$ for each signal in the plurality of signals y.

A pseudocode definition of an algorithm 400 for training a neural network to predict beamforming parameters to use in processing an incoming signal is illustrated in FIG. 4. As illustrated in the algorithm 400, the fully connected network can be trained sequentially as a series of sub-networks. A first sub-network may correspond to training for an initial set of input signals and an initial set of beamforming parameters, and subsequent sub-networks may correspond to networks for generating each of a plurality of beamforming parameters based on previously predicted beamforming parameters. In training the fully connected network, aspects of the present disclosure can sequentially build the fully connected network by training each preceding sub-network using a signal strength loss function. In some aspects, training the fully connected network may entail optimizing for the loss function defined by Equation 8. The loss function may be minimized or, correspondingly, the negative of the loss function may be maximized, so that a highest signal strength is achieved.

In some aspects, as illustrated in FIG. 4, training of the fully connected network may be divided into a static pretraining phase and sequential pretraining phase. The first sub-network may be trained in the static pretraining phase based on the training data set of signals y and beamforming parameters $W_{pilot}$. The first sub-network may be trained over a defined number of epochs, $N_{epoch}$, optimizing for the loss function defined by Equation 8, as discussed above. During the sequential pretraining phase, the subsequent sub-networks may be trained to generate a plurality of beamforming parameters based on previously predicted beamforming parameters. For each of a plurality of signals received subsequent to receiving the initial set of input signals, a sub-network may be trained over the defined number of epochs $N_{epoch}$, also optimizing for the loss function defined by Equation 8.

Generally, because sub-networks in the fully connected network are pretrained and cascaded, changes to parameters in one sub-network in the fully connected network may trigger changes to parameters in higher sub-networks (e.g., sub-networks used to predict beamforming parameters for subsequent received signals). Further, as the number of total signals based on which beamforming parameters are predicted increases, the number of sub-networks in the fully connected network may increase.

For a recurrent neural network, an exponentially weighted loss function may be used. This exponentially weighted loss function may be represented by the following equation:

$$\mathcal{L} = \sum_{t=0}^{5} \alpha_t \mathcal{L}_t, \text{ such that:} \quad (10)$$

$$\mathcal{L}_t = -\frac{1}{N_{train}} \sum_{m=1}^{N_{train}} |(w_{t+5}^{(m)})^H y_s^{(m)}|^2,$$

$$\alpha_t \propto \exp(-\beta(5-t)) \text{ and } \sum_{t=0}^{5} \alpha_t = 1.$$

where $\alpha_t$ corresponds to an exponential weight and $\mathcal{L}_t$ is the negative loss function over a signal strength of a beamformed signal defined by $(w_{t+5}^{(m)})^H y_s^{(m)}$.

To train the recurrent neural network, the loss function defined by Equation 10 may be maximized, or conversely, the negative of the loss function defined by Equation 10 may be minimized. As discussed, because there may not be supervised data available for the intermediate beamforming parameters between the final predicted beamforming parameters and the beamforming parameters included in the configured set of beamforming parameters, there may be no direct manner by which the trajectory through a universe of possible beamforming parameter candidates may be traversed. However, maximization of Equation 9 may allow for some guidance to be achieved, until the final predicted beamforming parameters $w_{10}$ are generated.

The techniques discussed herein generally allow for beamforming parameters to be generated that reduce the number of pilot signals that need to be detected and beamformed for situations such as initial access. For example, the signal strength performance of a set of predicted beamforming parameters over a number of pilot signals may approach the signal strength performance of a set of statically defined beamforming parameters that is significantly larger than the set of predicted beamforming parameters. Because fewer pilot signals may need to be detected before initial access can be successfully performed, processes such as initial access where pilot signals may be transmitted sparsely and for which performance may be important, for example, in maintaining or resuming connections with a wireless network, may be accelerated. Further, beamforming complexity may be decreased, as explicit angle of arrival estimation may not be needed for operations such as initial access.

Figure 5:
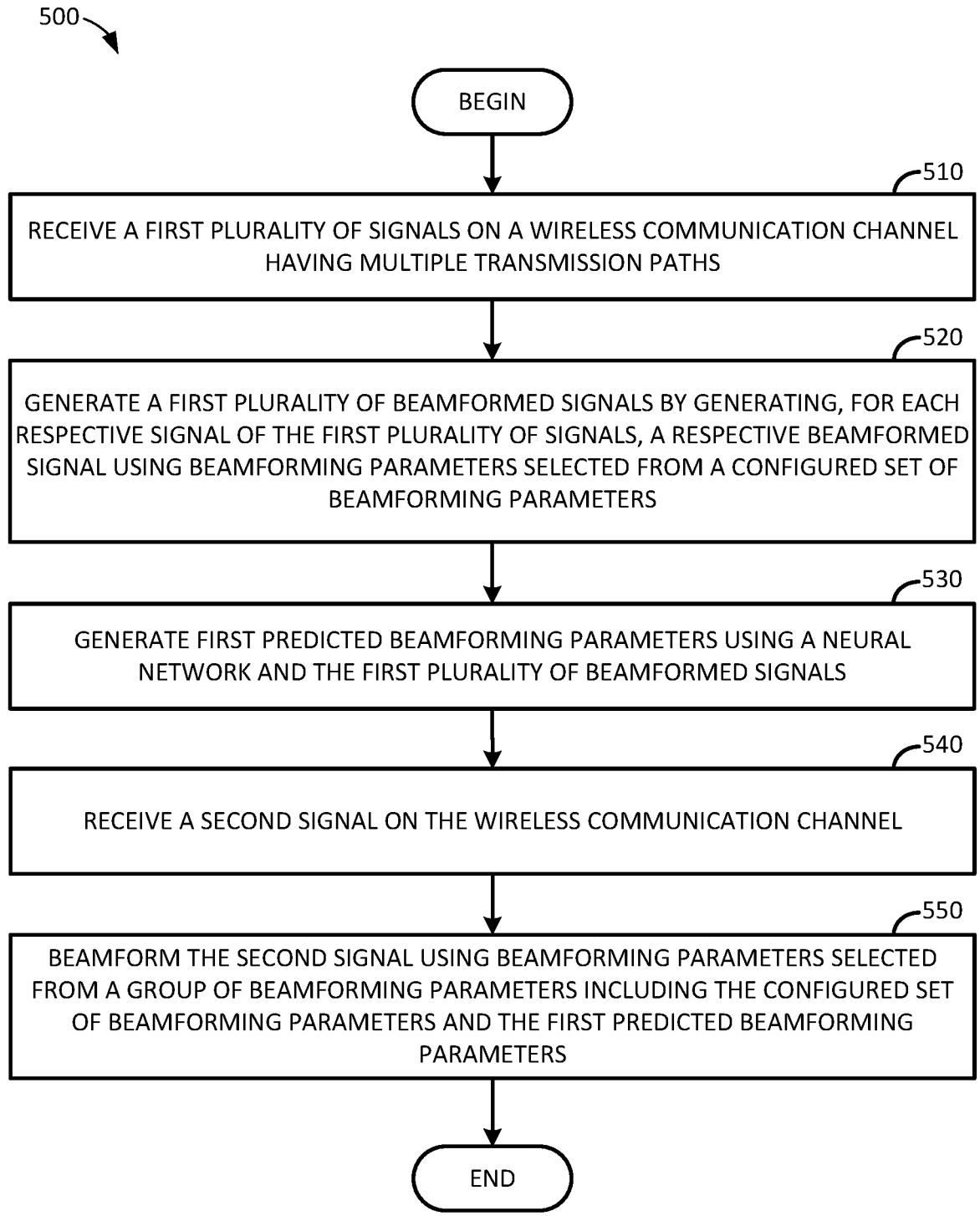
FIG. 5 depicts example operations for predicting beamforming parameters to use in processing received signaling using a neural network, according to aspects of the present disclosure.

FIG. 5 illustrates example operations 500 for predicting beamforming parameters to use in processing received signaling, according to aspects of the present disclosure. Operations 500 may be performed, for example, by a receiving wireless device (e.g., receiving device 120 illustrated in FIG. 1).

As illustrated, operations 500 may begin at block 510, where a first plurality of signals are received on a wireless communication channel comprising multiple transmission paths. As discussed, this first plurality of signals may be received on a wireless communication channel having unknown properties.

At block 520, the first plurality of signals is beamformed to generate a first plurality of beamformed signals. To generate the first plurality of beamformed signals, each respective signal of the first plurality of signals may be beamformed using beamforming parameters selected from a configured set of beamforming parameters. For example, given a first plurality of signals $\{y_1, y_2, y_3, y_4\}$, beamformed first plurality of signals $\{x_1, x_2, x_3, x_4\}$ may be generated by applying one of beamforming parameters $\{w_1, w_2, w_3, w_4\}$ to each one of the first plurality of signals. Generally, the selected beamforming parameters may be the beamforming parameters out of the configured set of beamforming parameters that result in a highest signal power metric for the respective beamformed signal of the first plurality of signals.

At block 530, first predicted beamforming parameters are generated using a neural network and the first plurality of beamformed signals. The first predicted beamforming parameters may, for example, correspond to beamforming parameters $w^*_5$ generated by fully connected network 204 in FIG. 2 or by fully connected network 306 illustrated in FIG. 3.

In some aspects, the neural network may be a fully connected neural network. The fully connected neural network may be a neural network trained based on maximization of a reference signal received power (RSRP) (or, conversely, minimization of a negative of a RSRP function).

In some aspects, the neural network may be a recurrent neural network (e.g., recurrent neural network 310 illustrated in FIG. 3). The recurrent neural network may be a neural network trained based on maximization of an exponentially weighted reference signal received power (RSRP) (or, conversely, minimization of a negative of an exponentially weighted RSRP function). In some aspects, as discussed above, the fully connected network 306 illustrated in FIG. 3 above may generate initial predicted beamforming parameters $w^*_5$, and subsequent predicted beamformers may be generated using the recurrent neural network.

At block 540, a second signal is received on the wireless communication channel.

At block 550, the second signal is beamformed using beamforming parameters selected from a group of beamforming parameters including the configured set of beamforming parameters and the first predicted beamforming parameters. That is, for a second signal $y_5$, the beamformed signal $x_5$ may be generated by applying one of beamforming parameters $\{w_1, w_2, w_3, w_4, w^*_5\}$ to the received signal.

In some aspects, as illustrated in the process of generating the dynamic group of beamforming parameters 214 illustrated in FIG. 2, second predicted beamforming parameters may be generated using the neural network and the beamformed second signal. A third signal may be received on the wireless communication channel. The third signal may be beamformed using beamforming parameters selected from a group of beamforming parameters including the configured set of beamforming parameters, the first predicted beamforming parameters, and the second predicted beamforming parameters. In this example, the second predicted beamforming parameters may be generated based on a signal beamformed using one of configured beamforming parameters, initial predicted beamforming parameters, or subsequently predicted beamforming parameters.

In some aspects, generating the first predicted beamforming parameters may include iteratively generating a plurality of beamforming parameters. Each of these iteratively generated beamforming parameters may be generated based, at least in part, on beamforming parameters used to process the first plurality of signals and the first plurality of beamformed signals until a threshold number of beamforming parameters have been generated.

Figure 6:
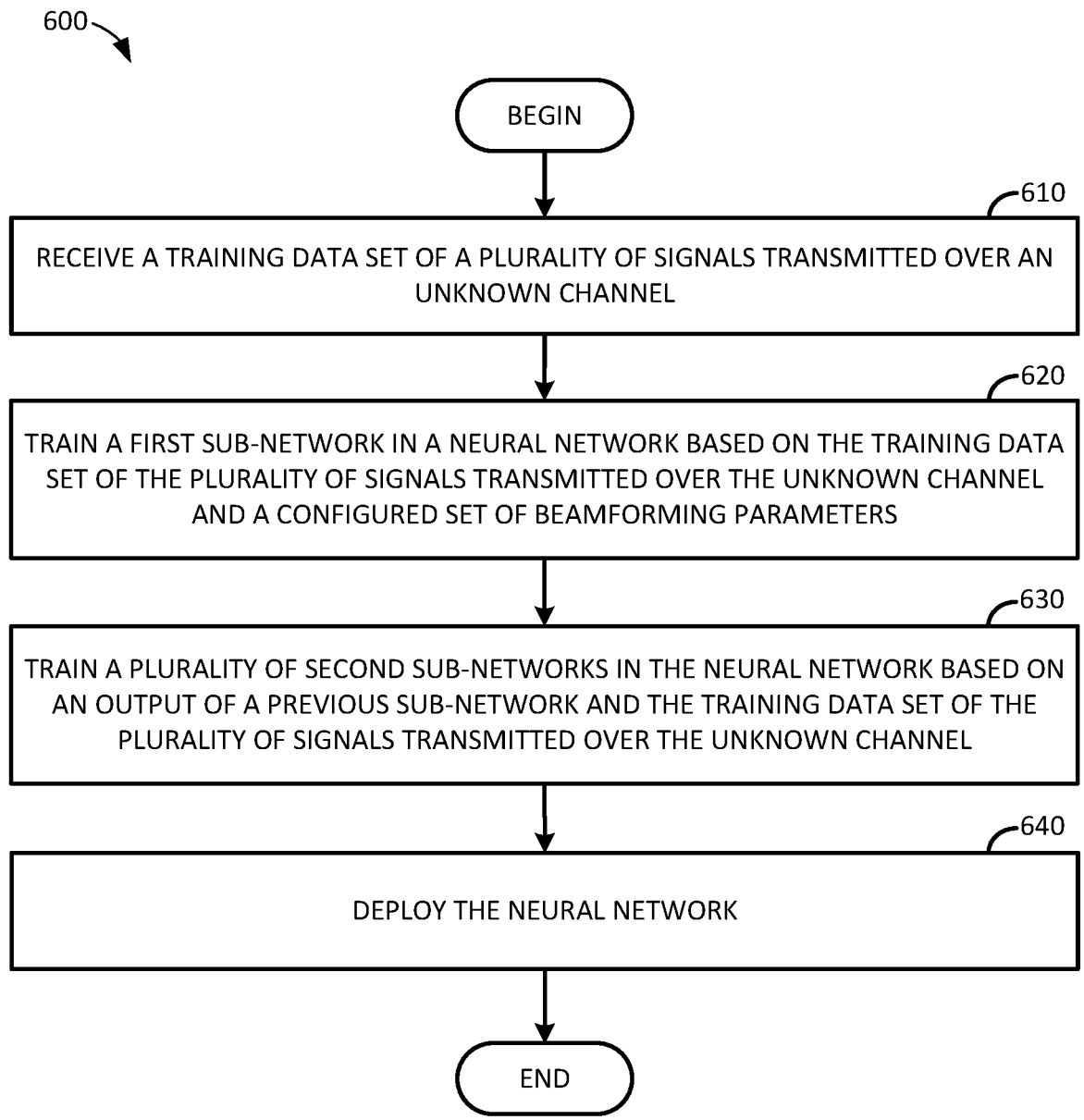
FIG. 6 depicts example operations for training a neural network to predict beamforming parameters to use in processing received signaling, according to aspects of the present disclosure.

FIG. 6 illustrates example operations 600 for training a neural network to predict beamforming parameters to use in processing received signaling, according to aspects of the present disclosure. Operations 600 may be performed, for example, by a computing device that can train the neural network and deploy the neural network to another device for use in predicting beamforming parameters to use in processing received signaling. For example, the computing device may be configured to deploy the neural network to receiving device 120 illustrated in FIG. 1. The computing device may be remote from or co-located with the receiving device 120.

As illustrated, operations 600 begin at block 610, where a training data set is received. The training data set generally includes a plurality of signals over an unknown channel.

At block 620, a first sub-network in a neural network is trained. The first sub-network is generally trained based on the training data set of the plurality of signals over the unknown channel and a configured set of beamforming parameters.

At block 630, a plurality of sub-networks in the neural network are trained. The plurality of sub-networks in the neural network may be trained based on an output of a previous sub-network and the training data set of the plurality of signals over the unknown channel.

At block 640, the neural network is deployed. The neural network may be deployed, for example, to a network entity, a base station (such as a gNodeB serving one or more devices in a New Radio (NR) wireless communication network or eNodeB serving one or more devices in a Long Term Evolution (LTE) wireless communication network), a user equipment (UE), or other device that can receive signaling and beamform the received signaling using predicted beamforming parameters generated by the neural network.

In some aspects, training the plurality of second sub-networks in the neural network may include training a preceding sub-network based on maximizing a reference signal received power (RSRP) loss function, or correspondingly, minimizing the negative of the RSRP loss function. In some aspects, the RSRP loss function may be an exponentially weighted RSRP loss function.

Figure 7:
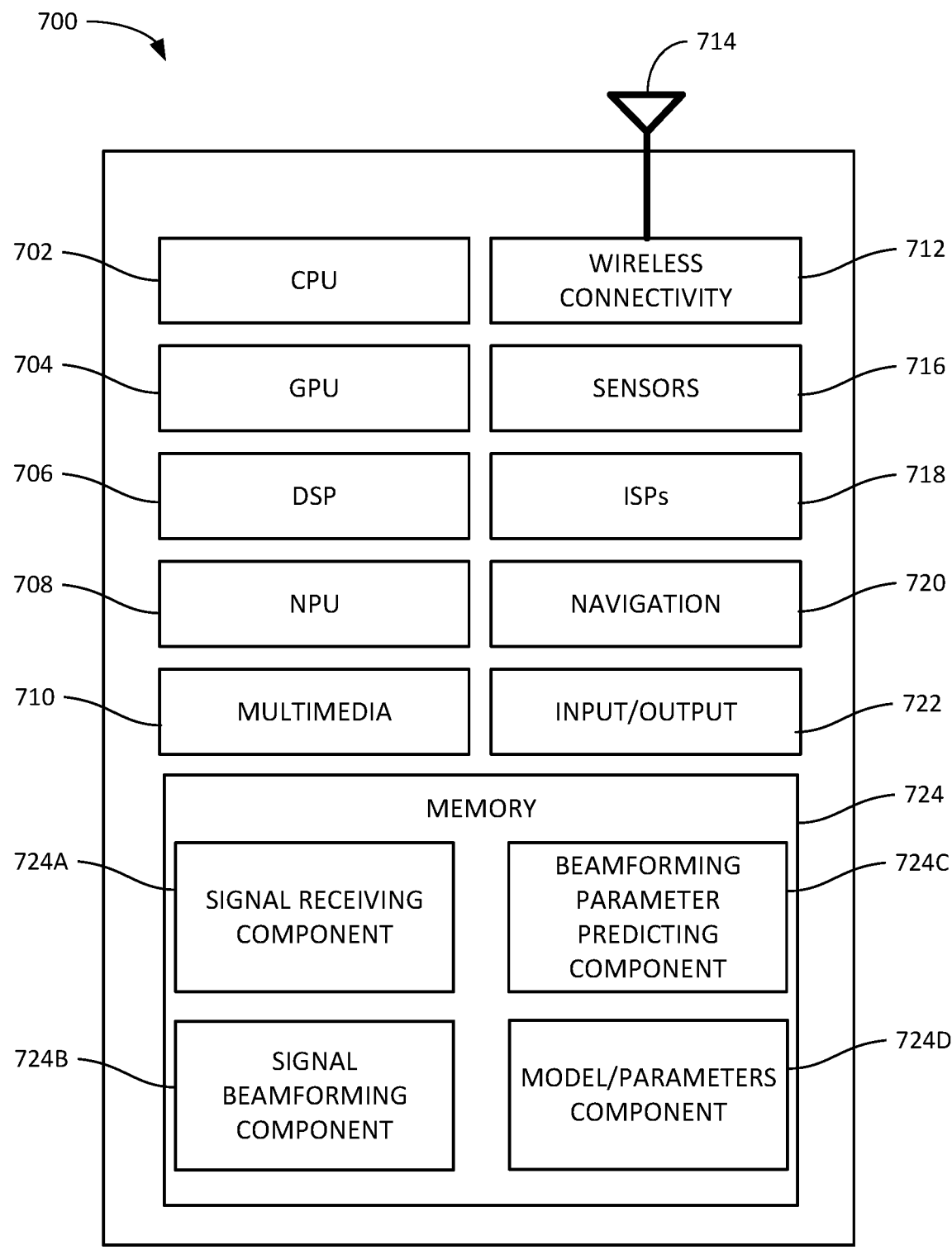
FIG. 7 depicts an example implementation of a processing system on which a neural network predicts beamforming parameters to use in processing received signaling, according to aspects of the present disclosure.

Example Processing Systems for Predicting Beamforming Parameters in Multipath Wireless Channels Using Neural Networks FIG. 7 depicts an example processing system 700 for generating predicted beamforming parameters to use in processing received signals using a neural network, such as described herein for example with respect to FIG. 5.

Processing system 700 includes a central processing unit (CPU) 702, which in some examples may be a multi-core CPU. Instructions executed at the CPU 702 may be loaded, for example, from a program memory associated with the CPU 702 or may be loaded from memory 724.

Processing system 700 also includes additional processing components tailored to specific functions, such as a graphics processing unit (GPU) 704, a digital signal processor (DSP) 706, a neural processing unit (NPU) 708, a multimedia processing unit 710, a wireless connectivity component 712.

An NPU, such as NPU 708, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as NPU 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 708 is a part of one or more of CPU 702, GPU 704, and/or DSP 706.

In some examples, wireless connectivity component 712 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 712 is further connected to one or more antennas 714.

Processing system 700 may also include one or more sensor processing units 716 associated with any manner of sensor, one or more image signal processors (ISPs) 718 associated with any manner of image sensor, and/or a navigation processor 720, which may include satellite-based positioning system components (e.g., GPS or GLONASS) as well as inertial positioning system components.

Processing system 700 may also include one or more input and/or output devices 722, such as screens, touch-sensitive surfaces (including touch-sensitive displays), physical buttons, speakers, microphones, and the like.

In some examples, one or more of the processors of processing system 700 may be based on an ARM or RISC-V instruction set.

Processing system 700 also includes memory 724, which is representative of one or more static and/or dynamic memories, such as a dynamic random access memory, a flash-based static memory, and the like. In this example, memory 724 includes computer-executable components, which may be executed by one or more of the aforementioned processors of processing system 700.

In particular, in this example, memory 724 includes signal receiving component 724A, signal beamforming component 724B, beamforming parameter predicting component 724C, and model/parameters component 724D. The depicted components, and others not depicted, may be configured to perform various aspects of the methods described herein (e.g., including those described with respect to FIG. 5 above).

Generally, processing system 700 and/or components thereof may be configured to perform the methods described herein.

Notably, in other embodiments, aspects of processing system 700 may be omitted, such as where processing system 700 is a server computer or the like. For example, multimedia processing unit 710, wireless connectivity component 712, sensor processing units 716, ISPs 718, and/or navigation processor 720 may be omitted in other embodiments. Further, aspects of processing system 700 may be distributed, such as training a model and using the model to generate inferences.

Figure 8:
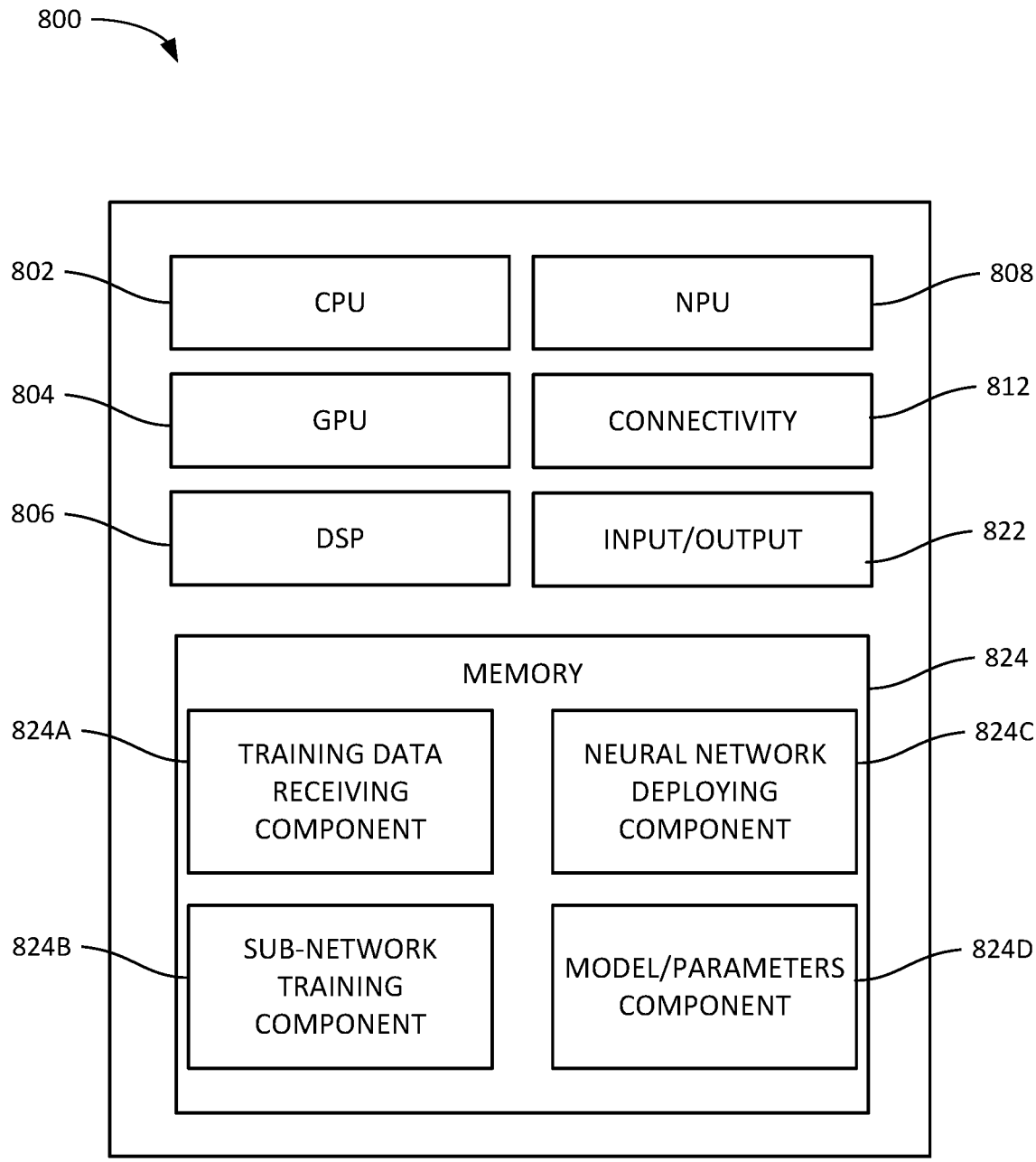
FIG. 8 depicts an example implementation of a processing system on which a neural network is trained to predict beamforming parameters to use in processing received signaling, according to aspects of the present disclosure.

FIG. 8 depicts an example processing system 800 for training a machine learning model, such as described herein for example with respect to FIG. 6.

Processing system 800 includes a central processing unit (CPU) 802, which in some examples may be a multi-core CPU. Processing system 800 also includes additional processing components tailored to specific functions, such as a graphics processing unit (GPU) 804, a digital signal processor (DSP) 806, and a neural processing unit (NPU) 808. CPU 802, GPU 804, DSP 806, and NPU 808 may be similar to CPU 702, GPU 704, DSP 706, and NPU 708 discussed above with respect to FIG. 7.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 812 may be further connected to one or more antennas (not shown).

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes training data receiving component 824A, sub-network training component 824B, neural network deploying component 824C, and model/parameters component 824D. The depicted components, and others not depicted, may be configured to perform various aspects of the methods described herein (e.g., including those described with respect to FIG. 6 above).

Generally, processing system 800 and/or components thereof may be configured to perform the methods described herein.

Notably, in other embodiments, aspects of processing system 800 may be omitted, such as where processing system 800 is a server computer or the like. For example, multimedia component 810, wireless connectivity component 812, sensor processing units 816, ISPs 818, and/or navigation component 820 may be omitted in other embodiments. Further, aspects of processing system 800 may be distributed, such as training a model and using the model to generate inferences.

Example Clauses

Implementation details are described in the following numbered clauses.

Clause 1: A method, comprising: receiving a first plurality of signals on a wireless communication channel; generating a first plurality of beamformed signals by generating, for each respective signal of the first plurality of signals, a respective beamformed signal using beamforming parameters selected from a configured set of beamforming parameters; generating a first predicted beamforming parameters using a neural network and the first plurality of beamformed signals; receiving a second signal on the wireless communication channel; and beamforming the second signal using beamforming parameters selected from a group of beamforming parameters including the configured set of beamforming parameters and the first predicted beamforming parameters.

Clause 2: The method of Clause 1, further comprising: generating second predicted beamforming parameters using the neural network and the beamformed second signal; receiving a third signal on the wireless communication channel; and beamforming the third signal based on beamforming parameters selected from a group of beamforming parameters including the configured set of beamforming parameters, the first predicted beamforming parameters, and the second predicted beamforming parameters.

Clause 3: The method of Clause 1 or 2, wherein generating the respective beamformed signal comprises selecting, for the respective signal of the first plurality of signals, beamforming parameters from the configured set of beamforming parameters predicted to result in a highest received signal power for the received second signal.

Clause 4: The method of any of Clauses 1 through 3, wherein the neural network comprises a fully connected neural network.

Clause 5: The method of Clause 4, wherein the fully connected neural network comprises a neural network trained based on maximization of a reference signal received power (RSRP).

Clause 6: The method of any of Clauses 1 through 5, wherein the neural network comprises a recurrent neural network.

Clause 7: The method of Clause 6, wherein the recurrent neural network comprises a neural network trained based on minimization of an exponentially weighted reference signal received power (RSRP) loss function.

Clause 8: The method of any of Clauses 1 through 7, wherein generating the first predicted beamforming parameters comprises iteratively generating a plurality of beamforming parameters based, at least in part, on beamforming parameters used to process the first plurality of signals and the first plurality of beamformed signals until a threshold number of beamforming parameters have been generated.

Clause 9: A method, comprising: receiving a training data set of a plurality of signals over an unknown channel; training a first sub-network in a neural network based on the training data set of the plurality of signals over the unknown channel and a configured set of beamforming parameters; training a plurality of second sub-networks in the neural network based on an output of a previous sub-network and the training data set of the plurality of signals over the unknown channel; and deploying the neural network.

Clause 10: The method of Clause 9, wherein training the plurality of second sub-networks in the neural network comprises training a preceding sub-network based on minimization of a negative of a reference signal received power (RSRP) loss function.

Clause 11: The method of Clause 10, wherein the RSRP loss function comprises an exponentially weighted RSRP loss function.

Clause 12: A processing system, comprising: a memory comprising computer-executable instructions; and one or more processors configured to execute the computer-executable instructions and cause the processing system to perform a method in accordance with any of Clauses 1-11.

Clause 13: A processing system, comprising means for performing a method in accordance with any of Clauses 1-11.

Clause 14: A non-transitory computer-readable medium comprising computer-executable instructions that, when executed by one or more processors of a processing system, cause the processing system to perform a method in accordance with any of Clauses 1-11.

Clause 15: A computer program product embodied on a computer-readable storage medium comprising code for performing a method in accordance with any of Clauses 1-11.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
   receiving a first plurality of signals on a wireless communication channel;
   generating a first plurality of beamformed signals by generating, for each respective signal of the first plurality of signals, a respective beamformed signal using beamforming parameters selected from a configured set of beamforming parameters;
   generating first predicted beamforming parameters using a neural network and the first plurality of beamformed signals;
   receiving a second signal on the wireless communication channel; and
   beamforming the second signal using beamforming parameters selected from a group of beamforming parameters including the configured set of beamforming parameters and the first predicted beamforming parameters.

2. The method of claim 1, further comprising:
   generating second predicted beamforming parameters using the neural network and the beamformed second signal;
   receiving a third signal on the wireless communication channel; and
   beamforming the third signal based on beamforming parameters selected from a group of beamforming parameters including the configured set of beamforming parameters, the first predicted beamforming parameters, and the second predicted beamforming parameters.

3. The method of claim 1, wherein generating the respective beamformed signal comprises selecting, for the respective signal of the first plurality of signals, beamforming parameters from the configured set of beamforming parameters predicted to result in a highest received signal power for the received second signal.

4. The method of claim 1, wherein the neural network comprises a fully connected neural network.

5. The method of claim 4, wherein the fully connected neural network comprises a neural network trained based on maximization of a reference signal received power (RSRP).

6. The method of claim 1, wherein the neural network comprises a recurrent neural network.

7. The method of claim 6, wherein the recurrent neural network comprises a neural network trained based on minimization of an exponentially weighted reference signal received power (RSRP) loss function.

8. The method of claim 1, wherein generating the first predicted beamforming parameters comprises iteratively generating a plurality of beamforming parameters based, at least in part, on beamforming parameters used to process the first plurality of signals and the first plurality of beamformed signals until a threshold number of beamforming parameters have been generated.

9. A method, comprising:
   receiving a training data set of a plurality of signals over an unknown channel;
   training a first sub-network in a neural network based on the training data set of the plurality of signals over the unknown channel and a configured set of beamforming parameters;
   training a plurality of second sub-networks in the neural network based on an output of a previous sub-network and the training data set of the plurality of signals over the unknown channel; and
   deploying the neural network.

10. The method of claim 9, wherein training the plurality of second sub-networks in the neural network comprises training a preceding sub-network based on minimization of a negative of a reference signal received power (RSRP) loss function.

11. The method of claim 10, wherein the RSRP loss function comprises an exponentially weighted RSRP loss function.

12. A processing system, comprising:
    a memory having executable instructions stored thereon; and
    a processor configured to execute the executable instructions in order to cause the processing system to:

receive a first plurality of signals on a wireless communication channel;
generate a first plurality of beamformed signals by generating, for each respective signal of the first plurality of signals, a respective beamformed signal using beamforming parameters selected from a configured set of beamforming parameters;
generate first predicted beamforming parameters using a neural network and the first plurality of beamformed signals;
receive a second signal on the wireless communication channel; and
beamform the second signal using beamforming parameters selected from a group of beamforming parameters including the configured set of beamforming parameters and the first predicted beamforming parameters.

13. The processing system of claim 12, wherein the processor is further configured to cause the processing system to:
generate second predicted beamforming parameters using the neural network and the beamformed second signal;
receive a third signal on the wireless communication channel; and
beamform the third signal based on beamforming parameters selected from a group of beamforming parameters including the configured set of beamforming parameters, the first predicted beamforming parameters, and the second predicted beamforming parameters.

14. The processing system of claim 12, wherein in order to generate the respective beamformed signal, the processor is configured to cause the processing system to select, for the respective signal of the first plurality of signals, beamforming parameters from the configured set of beamforming parameters predicted to result in a highest received signal power for the received second signal.

15. The processing system of claim 12, wherein the neural network comprises a fully connected neural network.

16. The processing system of claim 15, wherein the fully connected neural network comprises a neural network trained based on maximization of a reference signal received power (RSRP).

17. The processing system of claim 12, wherein the neural network comprises a recurrent neural network.

18. The processing system of claim 17, wherein the recurrent neural network comprises a neural network trained based on minimization of an exponentially weighted reference signal received power (RSRP) loss function.

19. The processing system of claim 12, wherein in order to generate the first predicted beamforming parameters, the processor is configured to cause the processing system to iteratively generate a plurality of beamforming parameters based, at least in part, on beamforming parameters used to process the first plurality of signals and the beamformed first plurality of signals until a threshold number of beamforming parameters have been generated.

20. A processing system, comprising:
a memory having executable instructions stored thereon; and
a processor configured to execute the executable instructions to cause the processing system to:
receive a training data set of a plurality of signals over an unknown channel;
train a first sub-network in a neural network based on the training data set of the plurality of signals over the unknown channel and a configured set of beamforming parameters;
train a plurality of second sub-networks in the neural network based on an output of a previous sub-network and the training data set of the plurality of signals over the unknown channel; and
deploy the neural network.

21. The processing system of claim 20, wherein in order to train the plurality of second sub-networks in the neural network, the processor is configured to cause the processing system to train a preceding sub-network based on minimization of a negative of a reference signal received power (RSRP) loss function.

22. The processing system of claim 21, wherein the RSRP loss function comprises an exponentially weighted RSRP loss function.

* * * * *